United States Patent [19]
Owen et al.

[11] Patent Number: 6,097,401
[45] Date of Patent: Aug. 1, 2000

[54] INTEGRATED GRAPHICS PROCESSOR HAVING A BLOCK TRANSFER ENGINE FOR AUTOMATIC GRAPHIC OPERATIONS IN A GRAPHICS SYSTEM

[75] Inventors: Richard Charles Andrew Owen, Seattle; Karl Scott Mills, Lynnwood, both of Wash.; Bradley Andrew May, San Jose, Calif.; Lauren Emory Linstad, Renton, Wash.

[73] Assignee: Cirrus Logic, Inc., Fremont, Calif.

[21] Appl. No.: 08/984,183

[22] Filed: Nov. 26, 1997

Related U.S. Application Data

[63] Continuation of application No. 08/550,795, Oct. 31, 1995, abandoned.

[51] Int. Cl.[7] .................................................. G06F 15/16
[52] U.S. Cl. ......................... 345/503; 345/519; 345/521; 345/525
[58] Field of Search .................................. 345/501–503, 345/519–522, 525, 526, 507, 509, 515, 513, 516, 512, 202, 203

[56] References Cited

U.S. PATENT DOCUMENTS

| | | | |
|---|---|---|---|
| 4,583,185 | 4/1986 | Heartz | 345/421 |
| 4,586,038 | 4/1986 | Sims et al. | 345/430 |
| 4,692,880 | 9/1987 | Merz et al. | 345/430 |
| 4,714,428 | 12/1987 | Bunker et al. | 345/118 |
| 4,715,005 | 12/1987 | Heartz | 345/421 |
| 4,727,365 | 2/1988 | Bunker et al. | 345/139 |
| 4,811,245 | 3/1989 | Bunker et al. | 345/429 |
| 4,821,212 | 4/1989 | Heartz | 345/426 |
| 4,825,391 | 4/1989 | Merz | 345/421 |
| 4,855,937 | 8/1989 | Heartz | 345/421 |
| 4,862,388 | 8/1989 | Bunker | 345/427 |
| 4,868,771 | 9/1989 | Quick | 395/500.29 |
| 4,905,164 | 2/1990 | Chandler et al. | 345/431 |
| 4,958,305 | 9/1990 | Piazza | 345/427 |
| 4,965,745 | 10/1990 | Economy et al. | 345/431 |
| 4,974,176 | 11/1990 | Buchner et al. | 345/428 |

(List continued on next page.)

FOREIGN PATENT DOCUMENTS

| | | |
|---|---|---|
| 0 157 254 | 10/1985 | European Pat. Off. |
| 0 182 454 | 5/1986 | European Pat. Off. |
| 0 279 231 | 8/1988 | European Pat. Off. |
| WO 96/36011 | 11/1996 | WIPO |

*Primary Examiner*—Ulka J. Chauhan
*Attorney, Agent, or Firm*—Blakely, Sokoloff Taylor & Zafman

[57] ABSTRACT

The present invention discloses methods and apparatus for implementing automatic graphics operations with selectable triggering mechanism. One mechanism is hardware related, using the vertical counter in the video control section of the graphics processor. The other mechanism is software related, using the host to directly command the graphics processor. The graphics operations are specified in the header file written by the host in the frame buffer memory. Several header files can be chained together to form a sequence of header files corresponding to very complex graphics operations. Automatic graphics operations, therefore, can be completed without further host intervention resulting in powerful graphics, video, and animation performance.

32 Claims, 5 Drawing Sheets

U.S. PATENT DOCUMENTS

| | | | |
|---|---|---|---|
| 5,046,023 | 9/1991 | Katsura et al. | 345/434 |
| 5,126,726 | 6/1992 | Howard et al. | 345/138 |
| 5,182,800 | 1/1993 | Farrell et al. | 710/24 |
| 5,187,754 | 2/1993 | Currin et al. | 382/284 |
| 5,191,642 | 3/1993 | Quick et al. | 345/427 |
| 5,218,674 | 6/1993 | Peaslee et al. | 345/525 |
| 5,224,210 | 6/1993 | Pinedo et al. | 345/501 |
| 5,265,203 | 11/1993 | Peaslee et al. | 345/502 |
| 5,268,996 | 12/1993 | Steiner et al. | 345/426 |
| 5,276,798 | 1/1994 | Peaslee | 345/505 |
| 5,283,863 | 2/1994 | Guttag et al. | 345/340 |
| 5,293,467 | 3/1994 | Buchner et al. | 345/422 |
| 5,303,321 | 4/1994 | Peaslee et al. | 345/443 |
| 5,357,579 | 10/1994 | Buchner et al. | 345/426 |
| 5,367,615 | 11/1994 | Economy et al. | 345/429 |
| 5,420,970 | 5/1995 | Steiner et al. | 345/433 |
| 5,493,646 | 2/1996 | Guttag et al. | 345/525 |
| 5,517,209 | 5/1996 | Holland et al. | 345/340 |
| 5,553,220 | 9/1996 | Keene | 345/520 |
| 5,572,657 | 11/1996 | Pinedo et al. | 707/526 |
| 5,583,984 | 12/1996 | Conrad et al. | 345/340 |
| 5,594,473 | 1/1997 | Miner et al. | 345/199 |
| 5,596,345 | 1/1997 | Goodfellow | 345/340 |
| 5,694,143 | 12/1997 | Fielder et al. | 345/112 |
| 5,706,478 | 1/1998 | Dye | 345/503 |
| 5,717,904 | 2/1998 | Ehlers et al. | 345/511 |
| 5,838,334 | 11/1998 | Dye | 345/503 |

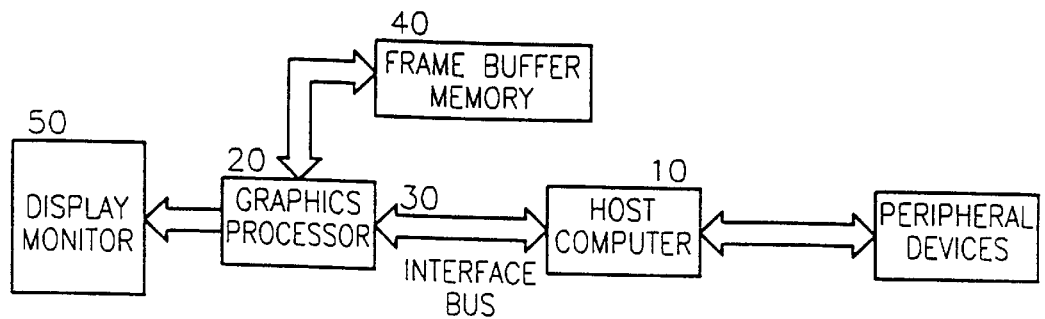
FIGURE 1  A TYPICAL GRAPHICS SYSTEM
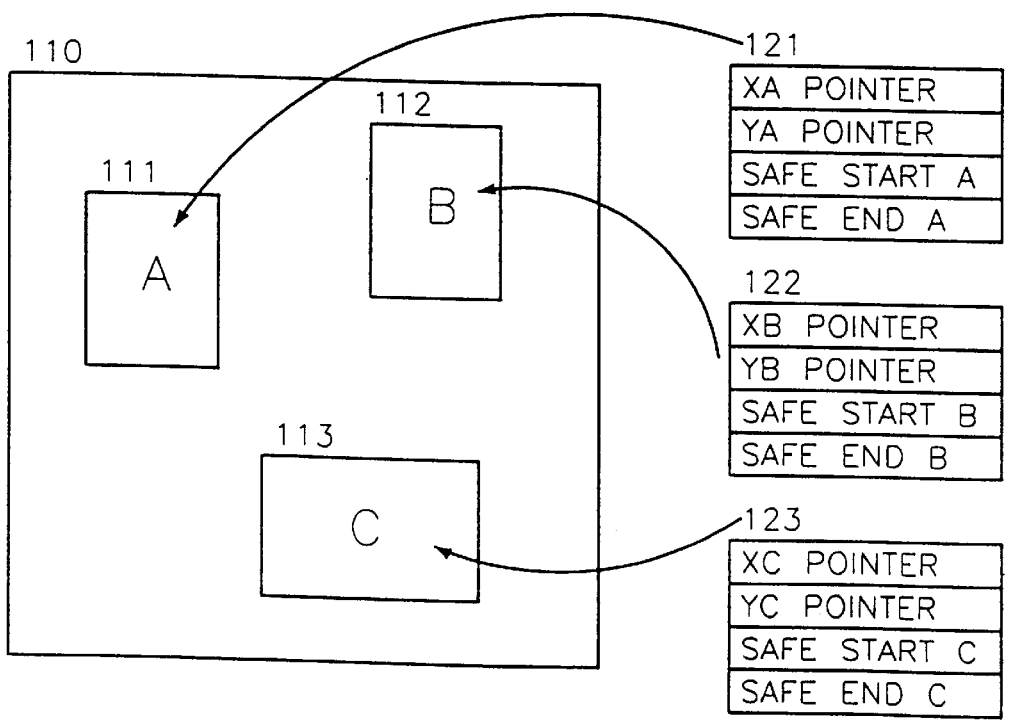
FIGURE 3  CORRESPONDENCE BETWEEN HEADER FILES AND GRAPHICS DISPLAY

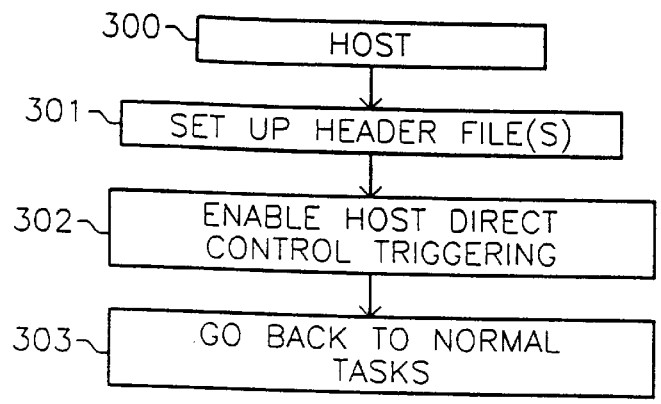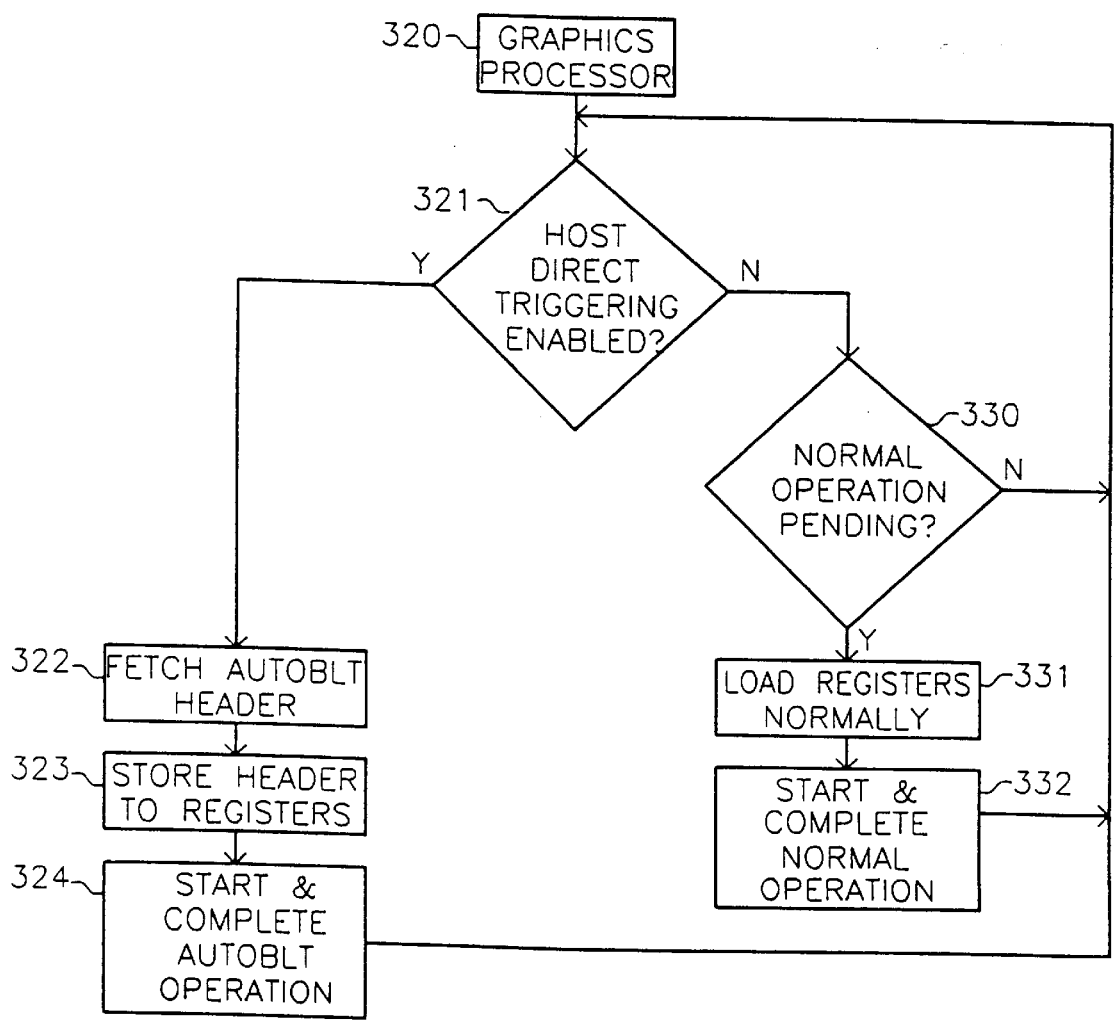
FIGURE 5

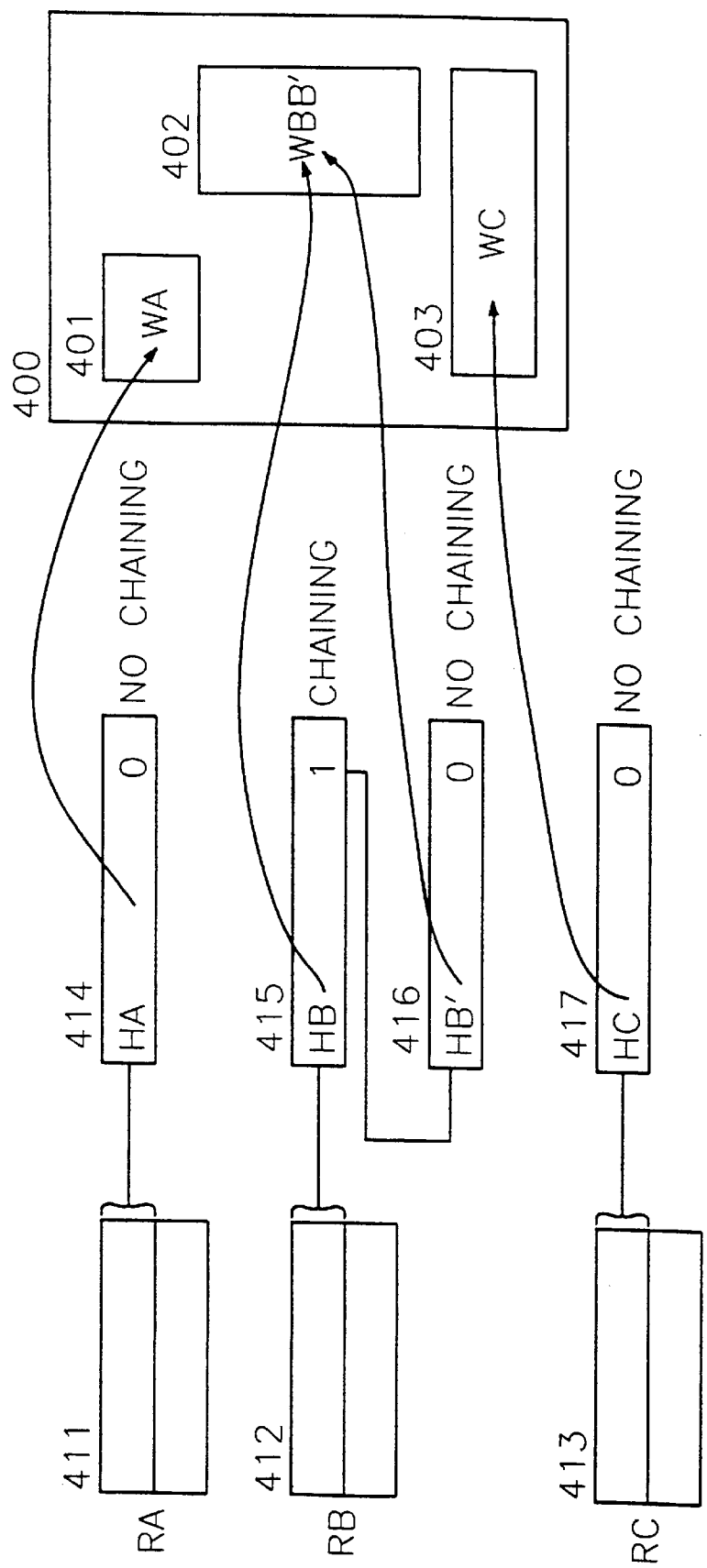
FIGURE 6    CHAINING OF HEADER FILES

INTEGRATED GRAPHICS PROCESSOR HAVING A BLOCK TRANSFER ENGINE FOR AUTOMATIC GRAPHIC OPERATIONS IN A GRAPHICS SYSTEM

This U.S. patent application filed by inventors Richard C. A. Owen, Karl S. Mills, Bradley A. May and Lauren E. Linstad is a continuation of now abandoned U.S. patent application Ser. No. 08/550,795, filed by inventors Richard C. A. Owen, Karl S. Mills, Bradley A. May and Lauren E. Linstad on Oct. 31, 1995 entitled "AUTOMATIC GRAPHICS OPERATION" and claims the benefit thereof.

BACKGROUND OF THE INVENTION

1. Field of the Invention

This invention relates to the field of high performance graphics systems, and more particularly to interfacing and interactions between the host computer and the graphics processor.

2. Description of the Related Art

Typical high performance graphics applications consist of a host computer with general capabilities and a specialized hardware graphics processor to perform dedicated graphic operations. A graphics processor has built-in hardware circuitry to carry out time-consuming tasks such as line drawing, block filling and block transfers (BLT). In addition, most graphics processors can be programmed to generate video control signals for video display. The host computer sends commands to and receives status from the graphics processor as part of its overall software. Upon receipt of the commands from the host, the graphics processor can carry out its operations independently. The host can also read the status of the graphics processor by accessing its internal registers or in some cases by monitoring the graphics processor signals. However, there is still some overhead involved in exchanging information. The problem becomes more pronounced when the host desires to send a series of commands to the graphics processor. The interaction between the host and the graphics processor, therefore, needs to be optimized to relieve the host of the burden of managing the graphics operations and the video control functions.

There are several interaction schemes that the host can adopt. First, in a polling scheme, the host can monitor the graphics processor (by reading a status bit for example) to determine if the previous set of commands has been completed so that it can send a new set of commands. The most serious drawback of this polling scheme is that it wastes host time because the host can go back to its normal function only after the entire graphic sequence has been completed. Second, in an interrupt scheme, the graphics processor can send an interrupt signal to the host when it finishes the set of commands. The problem with this interrupt scheme is that there is still some idle time before the host can respond, and the host might become inefficient for being continuously interrupted. It is therefore desirable to have a better interaction scheme that minimizes the interaction between the host and the graphics processor so that they can become more independent of each other.

In animation and video processing, the interaction problem becomes more severe. In these applications, there are two update rates: the animation update (or the image update) and the screen refresh. The animation update refers to the rate at which a new image replaces an old image. The screen refresh rate refers to the rate at which the video controller starts a new vertical retrace cycle. While the animation update rate depends on the nature of the image sequence and the speed of the graphics processor, the screen refresh rate depends on the type of display monitor and the programmed video control parameters. These two update rates are totally independent.

There are basically two schemes for updating the images in the display memory. In the first scheme, the display memory is written to as the display is being updated. Since there is no coordination between what part of the display memory is being displayed and what part is being altered, there can be an undesirable effect to the display, referred to as banding or tearing, where the image seems to jump or distort because part of the old image and part of the new image are displayed. In the second scheme, the new image or image portion is written into nonviewable memory space, and when the screen refresh is past the point where banding can occur, this memory content is transferred to the display memory. The problem with this scheme is that the host cannot independently predict when the screen refresh is at a safe point to send a transfer command. This is because screen refresh is an activity independent of the host and there is no relationship between the display clock and the host clock. Even with interrupts, there are still problems of software overhead, initialization, and reliability.

These scenarios show that there is a need for an optimized interaction scheme between the host and the graphics processor to minimize delays and avoid undesirable graphic effects. Graphics operations can then be carried out automatically without intervention from the host.

BRIEF SUMMARY OF THE INVENTION

The present invention comprises a high-performance graphics processor with many novel hardware built-in features. Important in the graphics processor of the present invention is the BLT Engine which acts as a central controller, initiating fetch, process, and store requests. One major feature of the BLT Engine, relevant in the present invention, is the automatic triggering. Automatic BLTs are triggered in one of two ways: (1) when the screen vertical count reaches a predetermined value, or (2) when the trigger bit is set by the host. In the first method, the host programs values to specify a safe region for automatic block transfers, and when the vertical counter reaches this safe range, BLT will be triggered. This method solves the problem of synchronization of the image updating with the screen refresh without host processor intervention. In the second method, the host has a direct control when it wants to trigger the auto BLTs.

During an automatic BLT, various variables for the BLT must be transferred from the frame buffer into the control path. These variables include source and destination location and extents, and the source of the next BLT in the chain. Chaining a sequence of BLT operations is accomplished by setting a bit in the LNCNTL register in the graphics processor.

This invention takes advantage of the automatic BLT triggering mechanism and automatic chaining of the graphics processor to implement the automatic graphics operation.

In the first configuration, the host builds up a set of graphics operations as a series of header files in nonviewable parts of the buffer memory (off screen memory). Each header file contains register data and graphics control data. The final entry in the header file points to the next operation to be executed. The last header file will contain a value for the LNCNTL which disables the chaining process. After writing the sequence of header files to the off screen memory, the host then commands the graphics processor to start execution, providing the location of the first header file. The graphics processor will read the header files and execute the specified graphics operations until it reaches the header containing the disabled chaining bit at which time all operations are completed. During the entire period, the host is free to carry out its normal tasks.

In the second configuration, the host builds up the sequence of header files as before. In addition, the host programs registers to specify the vertical scan line range within which to start the graphics operation. Then the host is free to go back to its normal tasks. When the vertical sync counter is within the specified vertical scan line range, the graphics processor will start the graphics operation as before.

BRIEF DESCRIPTION OF THE DRAWINGS

FIG. 1 is a block diagram showing a typical graphics system with host computer and video control.

FIG. 3 is a diagram showing the correspondence between a sequence of header files and the graphics display.

FIG. 5 is a flow diagram showing steps for automatic BLT operations using the host triggering mechanism.

FIG. 6 is a diagram showing the chaining of the header files.

DETAILED DESCRIPTION OF THE INVENTION

Figure 2:
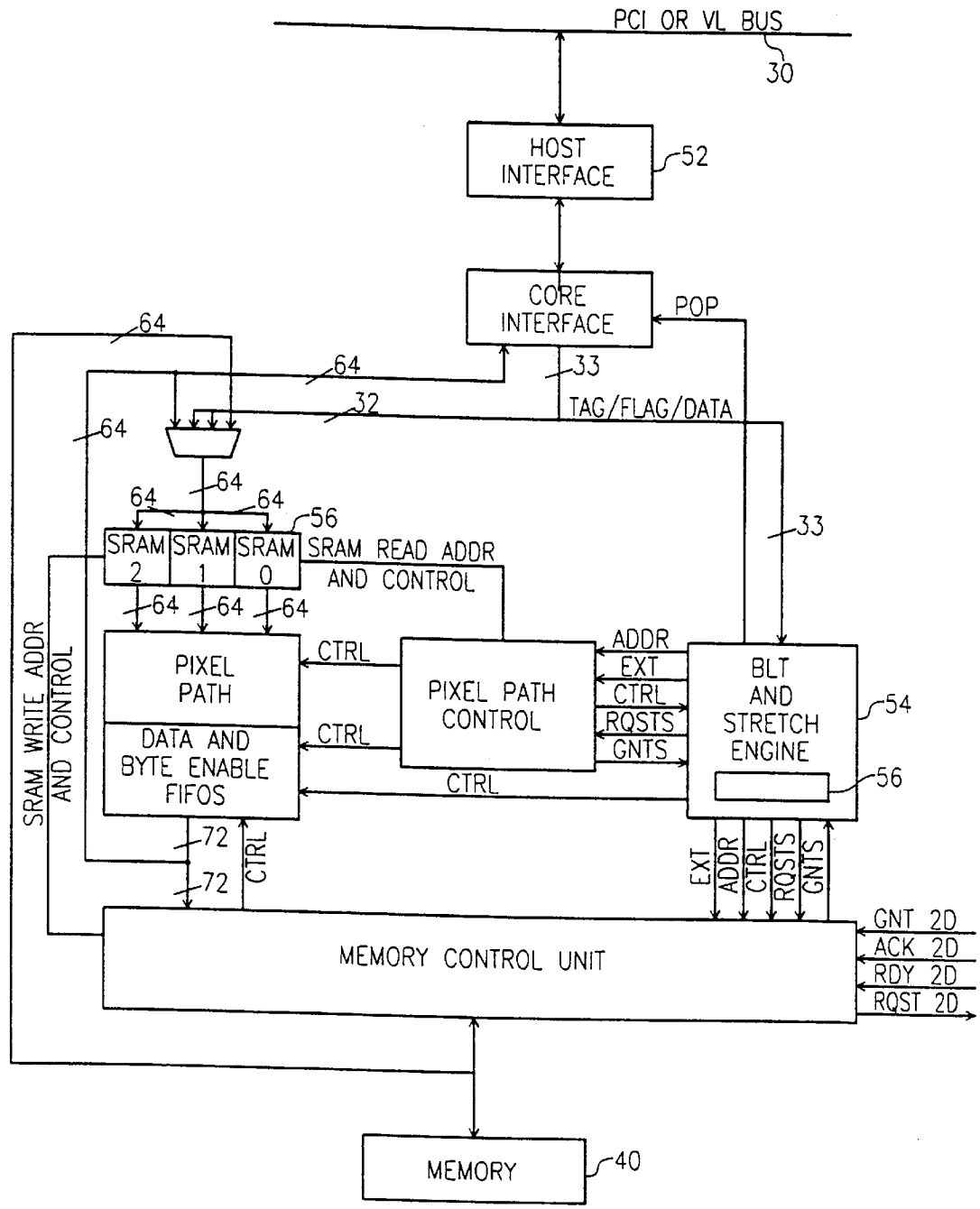
FIG. 2 is a detailed block diagram showing the graphics processor 20 of FIG. 1.

The present invention is best described by describing a typical preferred embodiment.

FIG. 1 shows a typical configuration of a graphics system. The host computer 10 is any general purpose processor with normal power and capability to interface with memories, peripheral devices and the graphics processor. The graphics processor 20 is a processor with built-in hardware circuitry for accelerated graphics operations and video control functions. Host computer 10 communicates with graphics processor 20 through interface bus 30. Both host computer 10 and graphics processor 20 can obtain information from frame buffer memory 40. In addition, graphics processor 20 generates video and video control signals to display monitor 50.

In a preferred embodiment, host computer 10 comprises an advanced processor 20 such as an Intel X86 type graphics processor or a Power PC processor. The graphics processor 20 is a high-performance graphics controller with hardware built-in features such as video control functions, BLT engine, and automatic block transfer (BLT) operations; and interface bus 30 is either a Peripheral Component Interconnect (PCI) or VL Video Electronics Standard Association (VESA) Local bus. PCI and VL buses are popular buses for the local interconnection between a host and peripheral devices such as a graphics controller. The PCI bus provides an interface to the host to access the frame buffer memory 40.

FIG. 2 is a detailed block diagram illustrating the graphics processor 20 of FIG. 1.

The following features are relevant to the present invention.

1. HOST INTERFACE 52:

The graphics processor 20 connects directly to any PCI or VL-Bus local bus 30. It provides an interface to the frame buffer memory 40. The frame buffer memory 40 can be allocated at least to: (1) accelerated display region, (2) SVGA (Super VGA) display region, and (3) autoBLT parameter region. The autoBLT parameter region is where the host 10 writes the header files and the graphics processor 20 retrieves the header files.

2. BLT ENGINE 54:

The BLT Engine 54 is the master controller for graphics operations. The BLT engine 54 causes data to be fetched from the frame buffer memory 40 into the internal static RAMs 56, initiates pixel path control operations, and causes the results to be stored back to the frame buffer memory 40, the SRAM 56, or the host 10.

The BLT engine 54 decodes commands it receives from the command pipe. The commands normally come directly from the host interface 52. The BLT engine 54 contains all of the registers 56 used in the lower level graphics functions. These registers 56 include pointers for frame buffer 40 and SRAM 56, BLT extents, resize BLT sources, and control registers.

3. GRAPHICS ACCELERATOR REGISTERS:

The graphics processor 20 has a set of graphics accelerator registers 56 located in the BLT engine 54 accessible as memory-mapped registers 56 occupying 16 Kbytes of memory space. These registers 56 are typically written by the host 10 to set up graphics operations executed by the graphics processor 20. Some of the relevant registers 56 are:

LNCNTL: Line control and Auto BLT control flags
COMMAND: Command/Data Register
OP$\{0-2\}_{13}$ opRDRAM: Color RDRAM Address Registers
RESIZE$\{A-C\}_{13}$ opRDRAM: Automatic BLT Header Source Address Registers
START$_{13}$ BLT$_{13}$ i (i=1,2,3): Start AutoBLT of Window i (i=1,2,3)
STOP$_{13}$ BLT$_{13}$ i (i=1,2,3): Stop AutoBLT of Window i (i=1,2,3)

The LNCNTL (Line Control) Register has 16 bits. The LNCNTL register has a Chain Enable bit which is used to chain auto BLTs together. When this bit is HIGH, auto BLT will fetch a new header when complete. When LOW, chaining is ended.

The COMMAND register is 32-bit. It allows direct access to the Write FIFO between the host and the BLT engine.

The CONTROL register is 16-bit. It controls and returns status of various parts of the command pipe and read/write FIFO. The CONTROL register has an AUTO_BLT_EN bit. When AUTO_BLT_EN is 0, the auto BLT arm/trigger mechanism is disabled, when 1, the mechanism operates normally.

The OP$\{0-2\}$_opRDRAM registers are 32-bit, supplying the RDRAM XY address to a selected OFU (Operand Fetch Unit). The OP0_opRDRAM register can store the result X byte and Y line address.

The RESIZE$\{A-C\}$_opRDRAM registers are 32-bit, containing the source address for the automatic Resize BLT, and the control bits for the automatic graphics operation. Each register contains a separate source address, triggered by the appropriate Vertical count from the vertical sync counter of the graphics processor. Each register has two control bits: TRIGGER and ARM. The TRIGGER bit is used to trigger auto BLT. When TRIGGER is HIGH, auto BLT is triggered as soon as the register is written. When TRIGGER is LOW, it waits for the vertical sync counters to reach the appropriate vertical count. The ARM bit is used to prepare for automatic BLT. When ARM is HIGH, automatic BLT is armed, i.e. when the vertical sync counter reaches the appropriate vertical count, auto BLT will start. When ARM is LOW, auto BLT must be armed externally. These control bits are summarized as follows:

| Trigger | Arm | Operation |
| --- | --- | --- |
| 0 | 0 | External arm |
| 0 | 1 | Automatic armed. Trigger when vertical count is reached. |
| 1 | 0 | Trigger auto BLT as soon as register is written. |
| 1 | 1 | INVALID |

The remaining bits of RESIZE{A–C}$_{13}$ opRDRAM are used to specify the vertical and horizontal positions where source data reside in RDRAM memory.

The START_BLT_1 8-bit register defines where (in multiples of 32 scanlines) during scan refresh AutoBLT of Window 1 is enabled, to prevent tearing of the window. AutoBLT is enabled when START_BLT_1≦current scanline<STOP_BLT_1. This register is disabled when bit 31 of RESIZEA$_{13}$ opRDRAM is 1.

The STOP_BLT_1 8-bit register defines where (in multiples of 32 scanlines) during screen refresh AutoBLT of Window 1 is disabled, to prevent tearing of the window. This register is disabled when bit 31 of RESIZEA_opRDRAM is 1. In addition, bit 7 (MSB) of this register is used to enable the Window 1. If it is 1, Window 1 is enabled; if it is 0, Window 1 is disabled, i.e., AutoBLT is not triggered.

The START_BLT_1 must be different from STOP_BLT_1.

The START_BLT$_{13}$ 2, STOP_BLT_2, START_BLT_3 and STOP_BLT_3 are similar except that the RESIZEB$_{13}$ opRDRAM and RESIZEC$_{13}$ opRDRAM, respectively, are used instead. Therefore, three windows can be set active at the same time with three different safe regions.

The START_BLT_i and STOP_BLT$_{13}$ i (i=1,2,3) define the safe regions for the autoBLT triggered by the vertical count value to carry out graphics operations without creating any undesirable effects.

AUTOMATIC BLT OPERATIONS

Two things need to be done to accomplish automatic BLT operation. First, a header file must be created to specify the graphics operations to be performed. This header file essentially contains the graphics variables to be loaded into the graphics processor. Second, after the header file is created, the triggering mechanism must be selected.

1. HEADER FILE

The header file contains data to be loaded to the graphics processor. The header file is written by the host into a nonviewable area of the frame buffer memory 40. The graphics processor will read the header file and fill its specified registers by the values contained in the header file. There are 28 registers whose values are specified in the header file. Each value requires 16 bits, therefore the total number of bytes to fill a header file is 56. The order of the registers in the header file must be followed.

2. TRIGGERING MECHANISM

The automatic BLT operation can be triggered by either of two ways: screen refresh and host direct control.

(1) Screen refresh.

The graphics processor 20 has its own video control circuitry to generate video control signals such as horizontal sync, vertical sync and pixel clock. Once initialized, the graphics processor 20 generates these signals independently of the BLT engine 54 and the host 10. Screen refresh is referred to as the mechanism in which the video screen is updated with new images. It is essentially dictated by the vertical sync. The graphics processor 20 has a vertical sync counter to increment the vertical line count. In applications such as animation or video, it is important to synchronize the updating of the images with the screen refresh to avoid any undesirable display effects.

When the TRIGGER and ARM bits in the RESIZE{A–C}_opRDRAM are programmed 0 and 1, respectively, the vertical sync triggering mechanism is enabled. The START_BLT_i and STOP_BLT_i registers provide the vertical count range in which the autoBLT will be triggered. As soon as the vertical count value exceeds the corresponding START_BLT$_{13}$ i, the autoBLT will start if the graphics processor is not busy doing something else. If the graphics processor is busy doing something else, it will complete that task and immediately start the autoBLT operations as long as the vertical count value is less than that in the corresponding STOP_BLT_i. Therefore, the START_BLT_i value and the STOP_BLT_i value give the earliest frame time and the latest frame time that autoBLT operations can start. Once started, the autoBLT operations will be completed regardless of the vertical count value. Therefore, the values written into START_BLT_i and STOP_BLT_i should be selected carefully to ensure that graphics operations can proceed safely without overwriting an image or image portion as it is being displayed.

Since there are three sets of independent registers for this autoBLT by screen refresh, three windows on the screen can be independently refreshed (e.g., updated).

FIG. 3 shows the correspondence between the autoBLT registers and the windows on the screen. The screen 110 is the screen of the monitor displaying the images. On the screen, the windows 111, 112 and 113 are three simultaneously active windows displayed on the screen. The parameter sets 121, 122 and 123 correspond to the windows 111, 112 and 113, respectively. The location of windows 111, 112 and 113 are specified by values in the parameter sets 121, 122, and 123 respectively. The location of the parameter sets is specified by RESIZE (A–C)$_{13}$ op RDRAM. The safe regions for the vertical line triggering are specified in the corresponding START_BLT_i and STOP_BLT_i registers.

Figure 4:
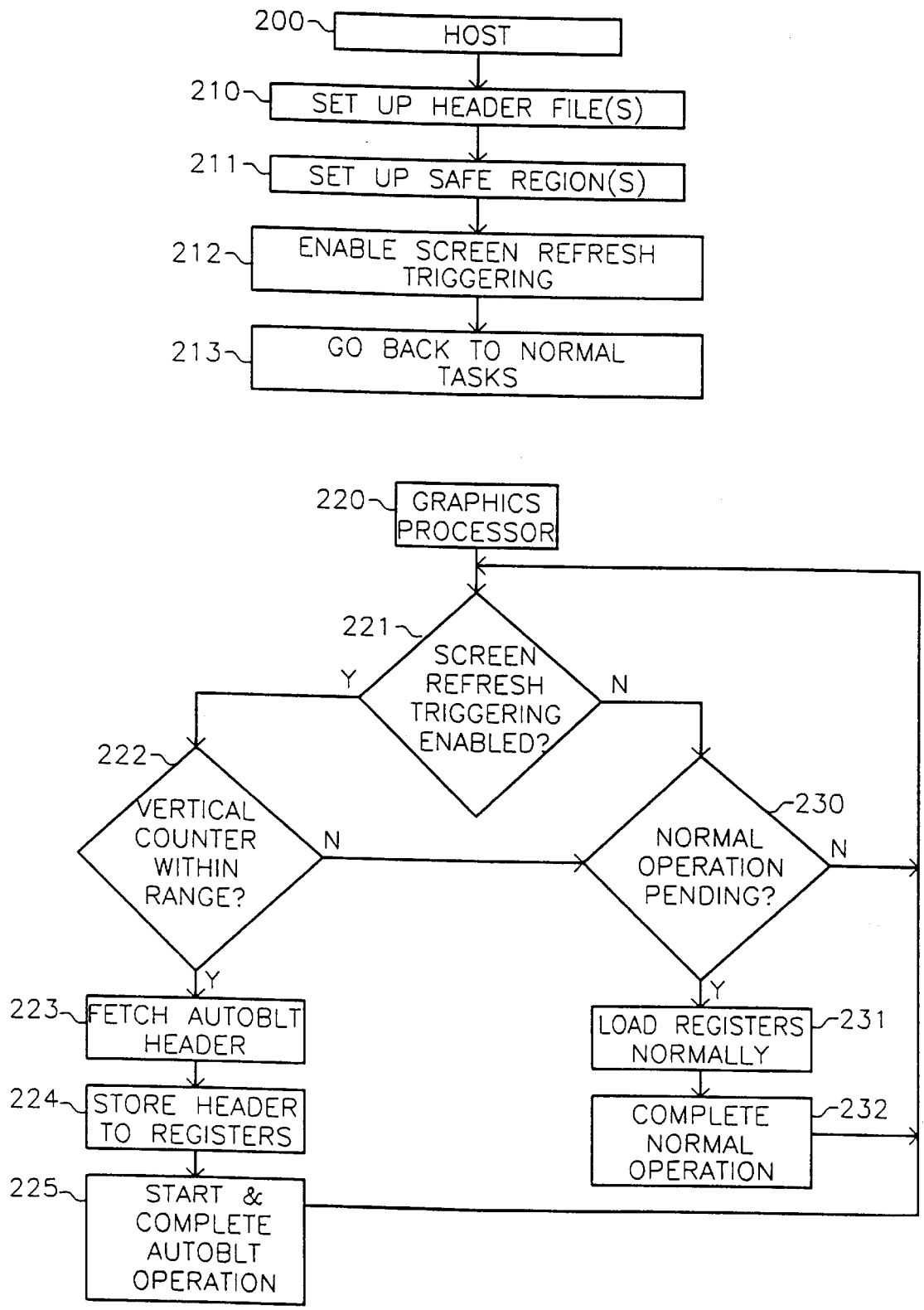
FIG. 4 is a flow diagram showing steps for automatic BLT operations using the screen refresh triggering mechanism.

FIG. 4 presents a flow diagram to illustrate the interactions between the host 10 and the graphics processor 20. Block 200 includes the steps performed by the host computer 10. Block 220 includes the steps performed by the graphics processor 20. In both blocks, it is assumed that the host computer 10 has other normal tasks to do such as servicing peripheral devices, executing the main program, and responding to interrupts. Similarly, the graphics processor 20 also has its own normal tasks to attend to such as generating video control signals. When the host computer 10 is ready to initiate automatic graphics operations, it will first build a header file, or a sequence of header files in which case chaining will be employed (to be discussed later). In step 210, the host 10 writes 56 bytes of the header file to the buffer memory 40. In step 211, the host 10 writes the start and stop values of the vertical scanlines to establish the safe region. Up to three safe regions can be established corresponding to three active windows, or three sets of automatic graphics operations. In step 212, the host 10 programs TRIGGER=0 and ARM=1 of the corresponding RESIZE{A–C}_opRDRAM registers to enable the screen refresh triggering mechanism. As soon as the graphics processor 20 is programmed with these bits, it will be ready for automatic operations. The host 10 then can go back to its normal tasks in step 213. Block 220 shows the steps carried out by the graphics processor. The following discussion will assume that only one window is active. In the preferred embodiment, three windows can be enabled at the same time. In step 221, if the host 10 has not enabled the screen refresh triggering option, the graphics processor 20 continues normal operation as shown in step 230. Once the screen refresh triggering option is enabled, the graphics processor 20 will enable the comparison of the internal vertical counter with the start and stop values programmed by the host 10. Since the comparison is done by independent hardware within the graphics processor, the graphics processor 20 is not busy when performing this task. At the end of every operation, the graphics processor 20 will check the results of this comparison as shown in step 222. If the vertical counter is outside the range established by the safe region, the graphics processor continues normal operation in step 230. If the vertical counter is within the range, the graphics processor will suspend normal operation and will fetch the automatic BLT header as shown in step 223. These values will then be stored to the registers (step 224), and the automatic BLT will then be executed in step 225. Once the automatic BLT is complete, the graphics processor 20 will return to step 221.

(2) Host Direct Control.

Although the screen refresh triggering mechanism allows the synchronization of BLT operations and the screen refresh, there are situations in which it is more desirable for the host to control the automatic BLT operations directly. In other words, the graphics processor will carry out the autoBLT operations immediately after being programmed by the host 10.

FIG. 5 shows a flow diagram to illustrate the interaction between the host 10 and the graphics processor 20. Block 300 consists of the host's steps and block 320 consists of the graphics processor's steps. As before, the host 10 first sets up the header file in step 301. When the host 10 is ready for autoBLT operations, in step 302 it will program the TRIGGER and ARM bits to be 1 and 0, respectively. Then the host 10 can go back to its normal tasks in step 303. On the graphics processor's side, in step 321, if the host 10 has not triggered the automatic BLT, normal operation will continue in step 330. If the trigger is enabled, the automatic operation will start in step 322.

LINKING GRAPHICS OPERATIONS

Although each header file contains sufficient information for a complete graphics operation, it is desirable to chain many header files together to allow a sequence of graphics operations to be performed without being interrupted by the host 10. In this way, very complex graphics tasks can be accomplished. This is possible because there is a chaining enable bit in the graphics processor. The LNCNTL register Chain Enable Bit is used to enable the chaining. When this bit is HIGH, chaining is enabled; when LOW, chaining is disabled. Each header file contains pointers for the next header file. These pointers are $NEXT_{13}$ HEAD.pt.X and NEXT_HEAD.pt.Y. (Note that the nonviewable area of the buffer memory is considered as a two dimensional extension of the viewable area, and that a header file may be written on any "line" (Y value) as well as at any choice of position on the line (X value).) When chaining is enabled, after the first BLT operation is completed, the graphics processor will read a new set of parameters from the location specified by NEXT_HEAD.pt.X and NEXT_HEAD.pt.Y and execute a new BLT. Chaining is continued until the Chain Enable Bit of LNCNTL is LOW indicating that this is the last header file in the sequence.

Chaining is independent of the triggering mechanism. Therefore, a sequence of autoBLT operations can be chained and triggered either by screen refresh or by the host as described above.

FIG. 6 shows a diagram illustrating the correspondence between chaining and displaying. Display screen 400 is the normal screen showing three active windows WA 401, WBB' 402, and WC 403. Register sets RA 411, RB 412 and RC 413 contain registers to specify the XY position and the safe regions corresponding to WA, WBB' and WC, respectively. The header memory area HA 414 and HC 417 contain the LNCNTL chaining enable bits which are zero, disabling the chaining. The autoBLT operations, therefore, are performed as specified in the header memory area HA 414 and HC 417 only. Header memory area HB has chaining, i.e., its chaining enable bit is one. Suppose the next header pointer in HB points to HB' 416 and the HB' header contain a chaining enable bit of zero. Then when the BLT operation in the header memory area HB is completed, the graphics processor will fetch the parameters contained in HB' header memory area and execute its BLT operation. After HB' BLT operation is completed, the graphics processor will return to its normal mode. The window WBB' 402 therefore shows the results of the two BLT operations from HB and HB'.

The combination of the automatic graphics operation triggered by either the screen refresh or the host 10 and the chaining method can produce very complex and powerful graphics operations without involving much host overhead and therefore minimize host interactions. In essence, graphics programs may be built in the buffer memory 40 by the host 10, and through the use of chaining in accordance with the present invention, executed and the results displayed without host intervention.

Finally, while the automatic graphics operation of the present invention has been disclosed and described with respect to a preferred embodiment thereof, it will be understood that the apparatus and methods of the present invention may be varied without departing from the spirit and scope of the invention.

What is claimed is:

1. An integrated graphics system for performing a graphics operation automatically, comprising:
  a graphics display monitor;
  a host computer;
  a frame buffer memory for coupling to said host computer to receive host instructions and images to be displayed on said graphics display monitor; and
  an integrated graphics processor coupled to said graphics display monitor, said host computer and said frame buffer memory, said integrated graphics processor having:
    video control circuitry to generate video control signals for control of the graphics display monitor;
    a first triggering circuit for initiating a first graphics operation; and a block transfer engine having a programmable register, coupled to said first triggering circuit, said block transfer engine for controlling transfers to and from said frame buffer memory, said block transfer engine also for executing said first graphics operation in response to said first triggering circuit, said block transfer engine for executing a type of graphics operation for said first graphics operation based on the content of said programmable register.

2. A graphics system for performing a graphics operation automatically, comprising:

a host computer;

a frame buffer memory coupled to said host computer; and a graphics processor coupled to said host computer and said frame buffer memory, said graphics processor having:

a first triggering circuit for initiating a first graphics operation;

a block transfer engine having a programmable register, coupled to said first triggering circuit, said block transfer engine for controlling transfers to and from said frame buffer memory, said block transfer engine also for executing said first graphics operation in response to said first triggering circuit, based on the content of said programmable register; and a second triggering circuit coupled to said block transfer engine, for initiating a second graphics operation, said programmable register in said block transfer engine executing said second graphics operation in response to said second triggering circuit, based on the content of said programmable register.

3. The graphics system of claim 2, wherein said graphics processor comprises a plurality of said programmable registers for executing a plurality of graphics operations based on the contents of said programmable registers in response to said first or second triggering circuits.

4. The graphics system of claim 2, wherein said programmable register consists of registers for storing a minimum value of a vertical scanline and a maximum value of said vertical scanline.

5. The graphics system of claim 4, wherein said programmable register consists of an enable bit for triggering said first triggering circuit when the enable bit is in a first enable state and for triggering said second triggering circuit when the enable bit is in a second enable state.

6. The graphics system of claim 5, wherein said graphics processor further comprises a video control circuit for incrementing a vertical counter value, and wherein said first triggering circuit is triggered when said enable bit is in said first enable state and said vertical counter value is between said minimum and maximum values of said vertical scanline.

7. A graphics system for performing a graphics operation automatically, comprising:

a host computer;

a frame buffer memory coupled to said host computer; and a graphics processor coupled to said host computer and said frame buffer memory, said graphics processor having:

a first triggering circuit for initiating a first graphics operation;

a block transfer engine having a programmable register, coupled to said first triggering circuit, said block transfer engine for controlling transfers to and from said frame buffer memory, said block transfer engine also for executing said first graphics operation in response to said first triggering circuit, based on the content of said programmable register; and wherein said first graphics operation is performed based on the content of a subset of said programmable register, said subset of said programmable register containing a chaining enable bit having a first and second chaining enable states and at least one position pointer indicating an address of a next subset of said programmable register.

8. The graphics system of claim 7, wherein said graphics processor retrieves the content of said next subset of said programmable register from said address and executes said first graphics operation when said chaining enable bit is at said first chaining enable state, said graphics processor returning to a normal mode when said chaining enable bit is at said second chaining enable state.

9. A method of automatic graphics operation, said method comprising the steps of:

providing a graphics display monitor;

providing a frame buffer memory for coupling to a host computer to receive host instructions and images to be displayed on the graphics display monitor;

providing an integrated graphics processor having a first triggering circuit for initiating a first graphics operation, said integrated graphics processor being coupled to said host computer, said frame buffer memory, and said graphics display monitor, said integrated graphics processor having video control circuitry to generate video control signals for control of said graphics display monitor, said integrated graphics processor further having a block transfer engine coupled to said first triggering circuit, said block transfer engine for controlling transfers to and from said frame buffer memory, said block transfer engine having a programmable register used to execute said first graphics operation in response to said first triggering circuit, said block transfer engine for executing a type of graphics operation for said first graphics operation based on the content of said programmable register.

10. A method of automatic graphics operation, said method comprising the steps of:

providing a frame buffer memory coupled to a host computer;

providing a graphics processor having a first triggering circuit for initiating a first graphics operation, said graphics processor being coupled to said host computer and said frame buffer memory; and providing a block transfer engine coupled to said first triggering circuit, for controlling transfers to and from said frame buffer memory, said block transfer engine having a programmable register used to execute said first graphics operation in response to said first triggering circuit, based on the content of said programmable register, and further providing a second triggering circuit coupled to said block transfer engine, for initiating a second graphics operation, said programmable register in said block transfer engine executing said second graphics operation in response to said second triggering circuit, based on the content of said programmable register.

11. The method of claim 10, wherein the step of providing a block transfer engine further comprises the step of providing a plurality of said programmable registers for executing a plurality of graphics operations based on the contents of said programmable registers in response to said first or second triggering circuits.

12. The method of claim 10, wherein the step of providing block transfer engine, said programmable register consists of registers for storing a minimum value of a vertical scanline and a maximum value of said vertical scanline.

13. The method of claim 12, wherein in the step of providing a block transfer engine, said programmable register consists of an enable bit for triggering said first triggering circuit when the enable bit is in a first enable state and for triggering said second triggering circuit when the enable bit is in a second enable state.

14. The method of claim 13, wherein in the step of providing a graphics processor, said graphics processor further comprises a video control circuit for incrementing a vertical counter value, and wherein said first triggering circuit is triggered when said enable bit is in said first enable state and said vertical counter value is between said minimum and maximum values of said vertical scanline.

15. A method of automatic graphics operation, said method comprising the steps of:

providing a frame buffer memory coupled to a host computer;

providing a graphics processor having a first triggering circuit for initiating a first graphics operation, said graphics processor being coupled to said host computer and said frame buffer memory; and providing a block transfer engine coupled to said first triggering circuit, for controlling transfers to and from said frame buffer memory, said block transfer engine having a programmable register used to execute said first graphics operation in response to said first triggering circuit, wherein said first graphics operation is performed based on the content of a subset of said programmable register, wherein said subset of said programmable register contains a chaining enable bit having a first and second chaining enable states and at least one position pointer indicating an address of a next subset of said programmable register.

16. The method of claim 15, wherein in the step of providing a graphics processor, said graphics processor retrieves the content of said next subset of said programmable register from said address and executes said first graphics operation when said chaining enable bit is at said first chaining enable state, said graphics processor returning to a normal mode when said chaining enable bit is at said second chaining enable state.

17. A integrated graphics processor for coupling to a host computer, a frame buffer memory, and a graphics display monitor, the integrated graphics processor for performing a graphics operation automatically, the integrated graphics processor comprising:

video control circuitry to generate video control signals for control of the graphics display monitor;

a first triggering circuit for initiating a first graphics operation; and a block transfer engine having a programmable register, coupled to said first triggering circuit, said block transfer engine for controlling transfers to and from said frame buffer including transfers between said frame buffer and said host computer to receive host instructions and images to be displayed on said graphics display monitor, said block transfer engine also for executing said first graphics operation in response to said first triggering circuit, said block transfer engine for executing a type of graphics operation for said first graphics operation based on the content of said programmable register.

18. A graphics processor coupled to a host computer and a frame buffer memory, for performing a graphics operation automatically, comprising:

a first triggering circuit for initiating a first graphics operation;

a block transfer engine having a programmable register, coupled to said first triggering circuit, said block transfer engine also for executing said first graphics operation in response to said first triggering circuit, based on the content of said programmable register; and a second triggering circuit coupled to said block transfer engine, for initiating a second graphics operation, said programmable register in said block transfer engine executing said second graphics operation in response to said second triggering circuit, based on the content of said programmable register.

19. A graphics processor coupled to a host computer and a frame buffer memory, for performing a graphics operation automatically, said graphics processor comprising:

a first triggering circuit for initiating a first graphics operation; and a block transfer engine having a plurality of programmable registers for executing a plurality of graphics operations based on the contents of said programmable registers in response to said first triggering circuit or a second triggering circuit, coupled to said first triggering circuit and said second triggering circuit, said block transfer engine also for executing said first graphics operation in response to said first triggering circuit, based on the contents of said programmable registers.

20. The graphics processor of claim 19, wherein said programmable register consists of registers for storing a minimum value of a vertical scanline and a maximum value of said vertical scanline.

21. The graphics processor of claim 20, wherein said programmable register consists of an enable bit for triggering said first triggering circuit when the enable bit is in a first enable state and for triggering said second triggering circuit when the enable bit is in a second enable state.

22. The graphics processor of claim 21, wherein said graphics processor further comprises a video control circuit for incrementing a vertical counter value, and wherein said first triggering circuit is triggered when said enable bit is in said first enable state and said vertical counter value is between said minimum and maximum values of said vertical scanline.

23. A graphics processor coupled to a host computer and a frame buffer memory, for performing a graphics operation automatically, comprising:

a first triggering circuit for initiating a first graphics operation; and a block transfer engine having a programmable register, coupled to said first triggering circuit, said block transfer engine also for executing said first graphics operation in response to said first triggering circuit, based on the content of said programmable register, wherein said first graphics operation is performed based on the content of a subset of said programmable register, said subset of said programmable register containing a chaining enable bit having a first and second chaining enable states and at least one position pointer indicating an address of a next subset of said programmable register.

24. The graphics processor of claim 23, wherein said graphics processor retrieves the content of said next subset of said programmable register from said address and executes said first graphics operation when said chaining enable bit is at said first chaining enable state, said graphics processor returning to a normal mode when said chaining enable bit is at said second chaining enable state.

25. An integrated graphics processor for coupling to a host processor and a graphics display, the integrated graphics processor minimizing the interaction between the host processor and the graphics processor for updating images displayed on the graphics display, the integrated graphics processor comprising:

video control circuitry for coupling to and controlling the graphics display;

vertical line counter to count a vertical line count value;

a plurality of programmable registers for coupling to the host processor to set up automatic graphic operations for execution by the integrated graphics processor; and a block transfer engine for automatically executing a graphics operation in response to a trigger for updating images displayed on the graphics display.

26. The integrated graphics processor of claim 25 wherein, the trigger is a screen refresh trigger which occurs when the vertical line count value counted by the vertical line counter falls within a range of safe vertical line count values stored within the plurality of programmable registers and the block transfer engine automatically executes a graphics operation for updating images displayed on the graphics display during screen refresh in response to the vertical line count value falling within the range of safe vertical line count values.

27. The integrated graphics processor of claim 26 wherein, the graphics processor performs a comparison between the vertical line count value counted by the vertical line counter and start and stop values defining the range of safe vertical line count values.

28. The integrated graphics processor of claim 25 wherein, the trigger is a host direct control trigger which occurs when one of the plurality of programmable registers is written to by the host processor coupled to the graphics processor and the block transfer engine automatically executes a graphics operation for updating images displayed on the graphics display immediately after the host processor writes to the one of the plurality of programmable registers.

29. The integrated graphics processor of claim 25 further comprising:

a memory control unit for coupling to a memory for providing frame buffering, the memory control unit for reading nonviewable memory locations in the memory where at least one header file has been stored by the host processor, the header file specifying a graphic operation to be performed by the integrated graphics processor and graphics variables to be loaded into the plurality of programmable registers of the integrated graphics processor.

30. The integrated graphics processor of claim 29 wherein, the integrated graphics processor has one bit of one of the plurality of registers indicating that the at least one header file is chained to at least one another header file for chaining a sequence of automatic graphic operations together for the integrated graphics processor to perform without being interrupted by the host processor, the at least one header file containing a pointer to the location of the at least one another header file.

31. The integrated graphics processor of claim 29 wherein, one of the plurality of registers contains an address pointing to the memory location containing the at least one header file.

32. A method of minimizing the interaction between a host processor and an integrated graphics processor in updating images displayed on a graphics display, the method comprising:

providing the integrated graphics processor having video control circuitry for controlling the graphics display, a vertical line counter to count a vertical line count value, a plurality of registers, and a block transfer engine for automatically executing a graphics operation in response to a trigger for displaying images on the graphics display;

the host processor storing automatic graphic operations into a memory coupled to the integrated graphics processor;

the integrated graphics processor reading the memory to determine an automatic graphic operation and storing parameters associated with the automatic graphic operation into the plurality of registers, a subset of the parameters stored into the plurality of registers including a range of safe vertical line count values for automatically starting the automatic graphic operation;

the integrated graphics processor performing a comparison to determine if the vertical line count value falls within the range of safe vertical line count values; and the integrated graphics processor automatically executing the automatic graphics operation if the comparison determines that the vertical line count value falls within the range of safe vertical line count values.

* * * * *